US012701441B2

(12) United States Patent
Balachandran

(10) Patent No.: US 12,701,441 B2
(45) Date of Patent: Aug. 4, 2026

(54) WIRELESS COMMUNICATION SYSTEMS FOR IDENTIFYING FAULTS

(71) Applicant: Boost SubscriberCo L.L.C., Englewood, CO (US)

(72) Inventor: Sumugam Balachandran, Frisco, TX (US)

(73) Assignee: Boost SubscriberCo L.L.C., Englewood, CO (US)

( * ) Notice: Subject to any disclaimer, the term of this patent is extended or adjusted under 35 U.S.C. 154(b) by 269 days.

(21) Appl. No.: 18/370,757

(22) Filed: Sep. 20, 2023

(65) Prior Publication Data

US 2025/0097738 A1 Mar. 20, 2025

(51) Int. Cl.
*H04W 24/04* (2009.01)
*H04L 41/0631* (2022.01)
*H04W 24/08* (2009.01)

(52) U.S. Cl.
CPC ........... *H04W 24/04* (2013.01); *H04L 41/064* (2013.01); *H04W 24/08* (2013.01)

(58) Field of Classification Search
None
See application file for complete search history.

(56) References Cited

U.S. PATENT DOCUMENTS

| | | | | |
|---|---|---|---|---|
| 11,210,160 | B1 * | 12/2021 | Dukhovny | .......... G06F 11/1438 |
| 11,477,667 | B2 * | 10/2022 | Cummings | ............. H04L 67/51 |
| 11,640,348 | B2 * | 5/2023 | Bugdayci | .............. G06F 11/301 |
| | | | | 709/224 |
| 11,811,588 | B2 * | 11/2023 | Ford | ...................... H04L 41/069 |
| 11,829,233 | B2 * | 11/2023 | Watkins | ................ G06N 20/20 |
| 11,830,341 | B2 * | 11/2023 | Malkan | .............. G01M 99/005 |
| 11,892,898 | B2 * | 2/2024 | Mecham | .............. G06F 11/079 |
| 11,892,996 | B1 * | 2/2024 | Anwar | ................ G06F 16/2379 |
| 11,924,018 | B2 * | 3/2024 | Tee | ....................... H04L 41/069 |
| 12,039,855 | B1 * | 7/2024 | Suri | ...................... F25D 29/006 |
| 12,045,316 | B2 * | 7/2024 | Côté | ................... G06F 18/2178 |
| 12,099,571 | B2 * | 9/2024 | Yan | ...................... G05B 13/027 |
| 12,105,610 | B2 * | 10/2024 | Muralidharan | ......... G06F 40/30 |
| 12,137,023 | B2 * | 11/2024 | Malleshaiah | ....... H04L 41/5067 |

(Continued)

FOREIGN PATENT DOCUMENTS

| | | | | |
|---|---|---|---|---|
| EP | 3815303 B1 * | 6/2024 | ......... | H04L 41/0661 |

*Primary Examiner* — Melvin H Pollack
(74) *Attorney, Agent, or Firm* — Lowenstein Sandler LLP

(57) ABSTRACT

A method for automatically identifying a fault condition in a wireless network can include receiving, at a trained machine learning model, from multiple subsystems of the wireless network, information associated with multiple alerts triggered across the multiple subsystems, each of the multiple alerts being indicative of a corresponding potential fault condition in one of the multiple subsystems, identifying, by the machine learning model, a subset of alerts of the multiple alerts, where the subset of alerts represents a set of one or more root fault conditions associated with the multiple alerts triggered across the multiple subsystems, and identifying, by the machine learning model, one or more remediating actions configured to address the one or more root fault conditions in at least one corresponding subsystem of the multiple subsystems. The machine learning model is trained using training data that identifies correlations between alerts generated in the multiple subsystems.

20 Claims, 4 Drawing Sheets

100

(56) References Cited

U.S. PATENT DOCUMENTS

| | | | | |
|---|---|---|---|---|
| 12,182,104 B1 * | 12/2024 | Singh | G06F 16/2228 |
| 12,197,431 B2 * | 1/2025 | Singh | G06F 17/40 |
| 12,212,451 B2 * | 1/2025 | Mortensen | G06N 5/01 |
| 12,223,263 B2 * | 2/2025 | Luthra | G06F 3/0486 |
| 12,244,454 B2 * | 3/2025 | Triplet | H04L 41/0627 |
| 12,265,459 B1 * | 4/2025 | Ross | G06F 11/076 |
| 12,362,988 B2 * | 7/2025 | Luthra | H04L 41/0604 |
| 12,380,316 B2 * | 8/2025 | Suthar | G08B 21/182 |
| 12,425,428 B1 * | 9/2025 | Sobrier | H04L 67/535 |
| 2022/0012608 A1 * | 1/2022 | Lehmann | G06F 11/3495 |
| 2023/0016199 A1 * | 1/2023 | Jividen | H04L 41/064 |
| 2023/0169170 A1 * | 6/2023 | Yaron | G06F 21/577 |
| | | | 726/1 |
| 2023/0236923 A1 * | 7/2023 | Gowri | G06F 11/0709 |
| | | | 714/4.1 |
| 2024/0106694 A1 * | 3/2024 | Koohmarey | H04L 41/06 |
| 2024/0121254 A1 * | 4/2024 | Gu | G06N 5/022 |
| 2024/0154858 A1 * | 5/2024 | Agrawal | G06F 11/0709 |
| 2024/0179539 A1 * | 5/2024 | Sakamoto | H04L 41/149 |
| 2024/0241945 A1 * | 7/2024 | Jain | G06F 21/552 |
| 2024/0330090 A1 * | 10/2024 | Mandal | G06F 40/284 |
| 2024/0370328 A1 * | 11/2024 | Balla | G06F 11/3409 |
| 2024/0419530 A1 * | 12/2024 | Harutyunyan | G06F 11/0709 |
| 2025/0005504 A1 * | 1/2025 | Sahoo | G06Q 10/087 |

* cited by examiner

100

200

Receiving information
associated with multiple
alerts
210

Receiving observation
information
220

Receiving information
regarding resources
230

Training the machine-
learning model
240

Identifying a subset of
alerts
250

Training the machine-
learning model
using the subset of
alerts
260

Identifying remediating
actions
270

300

WIRELESS COMMUNICATION SYSTEMS FOR IDENTIFYING FAULTS

TECHNICAL FIELD

The present disclosure relates to a wireless communication system, and more particularly, a method of predicting faults in complex wireless networks based on information received from a plurality of subsystems.

BACKGROUND

A network operations center (NOC) is a centralized location from which network administrators and technicians monitor, manage, and maintain a telecommunications or computer network. It serves as the nerve center of the network, providing real-time monitoring, troubleshooting, and coordination to ensure the network's smooth operation and quick response to any issues that arise.

SUMMARY

The present disclosure is directed to identifying faults in complex wireless networks.

According to one aspect of the subject matter described in this application, a method for automatically identifying a fault condition in a wireless network can include receiving, at a trained machine learning model from multiple subsystems of the wireless network, information associated with multiple alerts triggered across the multiple subsystems, each of the multiple alerts being indicative of a corresponding potential fault condition in one of the multiple subsystems, identifying, by the machine learning model, a subset of alerts of the multiple alerts, where the subset of alerts represents a set of one or more root fault conditions associated with the multiple alerts triggered across the multiple subsystems, a number of alerts in the subset of alerts being less than the number of the multiple alerts, and identifying, by the machine learning model, one or more remediating actions configured to address the one or more root fault conditions in at least one corresponding subsystem of the multiple subsystems, where the machine learning model is trained using training data that identifies correlations between alerts generated in the multiple subsystems.

Implementations according to this aspect can include one or more of the following features. For example, the wireless network can be configured to perform fifth generation (5G) cloud-native network operations.

In some implementations, the multiple subsystems can include an external provider configured to provide a range of network testing, monitoring, and analytics solutions, a central component configured to perform collecting, storing, analyzing, and visualizing telemetry data, a radio access network (RAN) configured to provide wireless connectivity between user devices and the wireless network, and a cloud computing model configured to provide a platform for developing, deploying, and managing applications. In some examples, each of the multiple subsystems can be configured to monitor, measure, and analyze a performance of the wireless network.

In some implementations, the method can further include generating a dashboard configured to provide real-time visibility and management of network operations of the wireless network in a single interface, where the dashboard can be configured to display the subset of alerts. In some implementations, identifying the subset of alerts can include identifying a timeline of events associated with the subset of alerts.

In some examples, identifying the subset of alerts of the multiple alerts can include identifying unusual patterns of behavior in the multiple alerts to correlate the subset of alerts associated with the identified unusual patterns of behavior. In some examples, identifying the subset of alerts of the multiple alerts can include combining the multiple alerts into the subset of alerts.

In some implementations, identifying the subset of alerts of the multiple alerts can include setting a threshold value that changes over time and identifying the subset of alerts of the multiple alerts, among the multiple alerts, associated with a value greater than the threshold value. In some implementations, the method can further include receiving, from a network platform, information regarding resources of the wireless network, where identifying the subset of alerts can include identifying the subset of alerts based on the information regarding resources, and the information regarding the resources can include a topology of the wireless network.

According to another aspect of the subject matter described in this application, a system for automatically identifying a fault condition in a wireless network can include multiple subsystems configured to monitor, measure, and analyze a performance of the wireless network, memory, and at least one processor coupled to the memory and using a trained machine learning model. The at least one processor can be configured to receive, at the machine learning model from multiple subsystems of the wireless network, information associated with multiple alerts triggered across the multiple subsystems, each of the multiple alerts being indicative of a corresponding potential fault condition in one of the multiple subsystems, identify, by the machine learning model, a subset of alerts of the multiple alerts, where the subset of alerts represents a set of one or more root fault conditions associated with the multiple alerts triggered across the multiple subsystems, a number of alerts in the subset of alerts being less than the number of the multiple alerts, and identify, by the machine learning model, one or more remediating actions configured to address the one or more root fault conditions in at least one corresponding subsystem of the multiple subsystems, where the machine learning model is trained using training data that identifies correlation between alerts generated in the multiple subsystems.

Implementations according to this aspect can include one or more of the following features. For example, the wireless network can be configured to perform fifth generation (5G) cloud-native network operations.

In some implementations, the multiple subsystems can include an external provider configured to provide a range of network testing, monitoring, and analytics solutions, a central component configured to perform collecting, storing, analyzing, and visualizing telemetry data, a radio access network (RAN) configured to provide wireless connectivity between user devices and the wireless network, and a cloud computing model configured to provide a platform for developing, deploying, and managing applications. In some implementations, the at least one processor can be further configured to generate a dashboard configured to provide real-time visibility and management of network operations of the wireless network in a single interface, where the dashboard is configured to display the subset of alerts.

In some examples, identifying the subset of alerts can include identifying a timeline of events associated with the subset of alerts. In some examples, identifying the subset of alerts of the multiple alerts can include identifying unusual patterns of behavior in the multiple alerts to correlate the subset of alerts associated with the identified unusual patterns of behavior.

In some implementations, identifying the subset of alerts of the multiple alerts can include combining the multiple alerts into the subset of alerts. In some implementations, identifying the subset of alerts of the multiple alerts can include setting a threshold value that changes over time and identifying the subset of alerts of the multiple alerts, among the multiple alerts, associated with a value greater than the threshold value.

In some examples, the at least one processor can be further configured to receive, from a network platform, information regarding resources of the wireless network, where identifying the subset of alerts can include identifying the subset of alerts based on the information regarding resources. In some examples, the information regarding the resources can include a topology of the wireless network.

DETAILED DESCRIPTION

Figure 1:
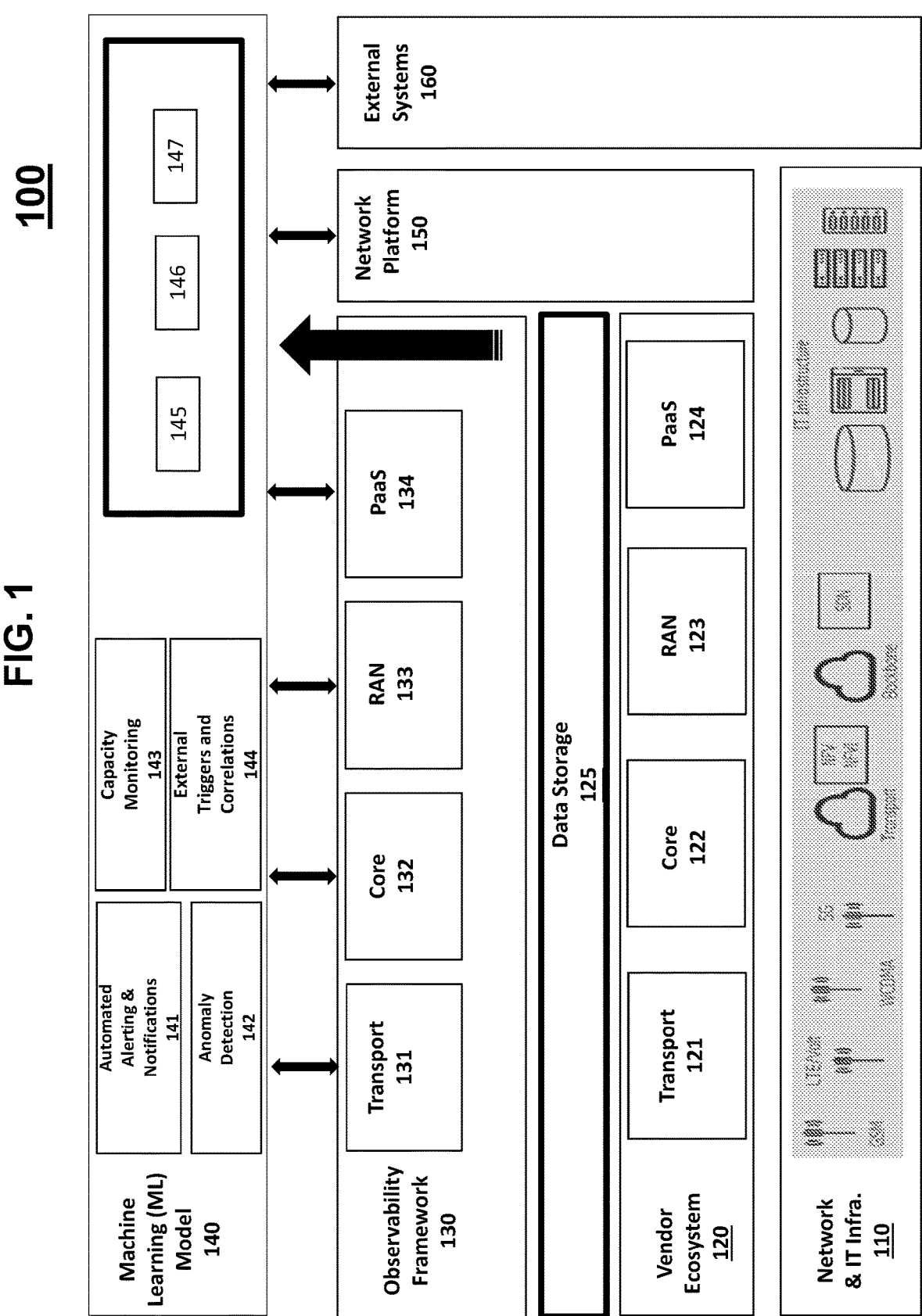
FIG. 1 is a diagram illustrating an example of a network system.

Operating a network operations center (NOC) with thousands of network administrators and technicians to monitor and manage a network presents several challenges. These challenges can stem from the scale and complexity of the network, the volume of data to be analyzed, and the need for swift and accurate decision-making.

The technology described herein allows for predicting faults in complex wireless networks based on information received from multiple subsystems, external systems, etc., where such faults can interfere with operations of the wireless networks. For example, a 5G open radio access network (O-RAN) deployed in a cloud-based infrastructure can include multiple connected subsystems such as the core, access, platform-as-a-service (PaaS), and transport subsystems, which cooperatively provide the services of the network. The cloud-based infrastructure can further include external systems providing information regarding customer experience, and a network platform providing inventory solutions such as network topologies.

If an anomaly or fault can be identified or predicted, this can potentially prevent operational disruptions in multiple connected subsystems. In the presence of a large number of alerts from various subsystems, it can be challenging to predict faults in the wireless networks, in turn making it difficult to identify a remediation process to address the issues.

The technology described herein uses an artificial intelligence/machine learning (AI/ML) framework in which a machine learning model is trained to receive, for example, one or more of: multiple alerts triggered at various subsystems of a network, information regarding customer experience associated with the wireless network, and information regarding network resources, including physical and virtual assets, from a network platform providing inventory solutions, and to predict or identify one or more conditions (e.g., faults, root causes of the alerts, etc.) in the wireless network. For example, the machine learning model can be trained to correlate the multiple alerts with the system topology and the customer experience (e.g., using training data that identifies correlations between alerts generated in the multiple subsystems), and predict or identify the one or more conditions in the network. For example, the machine learning model can be used to identify a root cause for multiple disparate alerts triggered at various subsystems of a 5G O-RAN, and can be configured to potentially generate one or more signals that initiate a corresponding remedial measure. In some cases, the machine learning model can be configured to predict one or more conditions (e.g., faults, component failures etc.) of the network based on the received information such that remedial actions can be preemptively taken in order to ensure continued operation of the network and/or prevent debilitating service outages. Moreover, the machine learning model can be progressively improved using a feedback mechanism.

The technology described herein can provide multiple advantages. For example, predicted faults can be addressed beforehand to potentially preempt large-scale outages and maintain service quality of the network. In some cases, this can significantly reduce, and potentially eliminate the need for high-granularity network surveillance for fault isolation and management, thereby providing for efficient network administration and management. In addition, appropriate remedial actions can be automatically identified, thereby providing for efficient workflow automation, fault management, and orchestration of advanced remediation. In some cases, this can result in continued and unimpeded operations of wireless networks such as 5G O-RANs to provide at least a threshold level of service even during adverse conditions in the network.

In addition, the technology described herein allows for detecting root cause faults in complex wireless networks where such faults potentially trigger a cascade of alerts in multiple connected subsystems. For example, a 5G open radio access network (O-RAN) deployed in a cloud-based infrastructure can include multiple connected subsystems such as the core, access, platform-as-a-service (PaaS), and transport subsystems, which cooperatively provide the services of the network. If an anomaly or fault occurs in one subsystem, this can cause operational disruptions in multiple connected subsystems, potentially causing multiple subsystems to trigger corresponding alerts. In the presence of a large number of alerts from various subsystems, it can be challenging to identify the root cause of the alerts, in turn making it difficult to identify a remediation process to address the issues.

The technology described herein uses an artificial intelligence/machine learning (AI/ML) framework in which a machine learning model is trained to receive multiple alerts triggered by various subsystems of a network and identify a root cause of the alerts. For example, the machine learning model can be made aware of the system topology, and can be trained using training data that identifies correlations between alerts generated in the multiple subsystems.

The technology described herein can provide multiple advantages. For example, duplication of alarms can be avoided, and the relevant root incident(s) associated with a fault or anomaly can be quickly identified. In some cases, an event timeline can be automatically generated, and a report of the incident can be automatically created and appropriately delegated for efficient resolution. In some cases, this can significantly reduce, and potentially eliminate the need for high-granularity network surveillance for fault isolation and management. In addition, appropriate remedial actions can be automatically identified, thereby providing for efficient workflow automation and orchestration of advanced remediation.

FIG. 1 is a diagram illustrating an example of a network system. Referring to FIG. 1, a network system 100 can include a network 110, a vendor ecosystem 120, a data storage 125, an observability framework 130, a machine learning model 140, a network platform 150, and external systems 160.

The network 110 can include an infrastructure that supports the fifth generation of wireless technology, commonly known as 5G. For example, the network 110 can include a base station (also known as a cell site or radio tower) that is a crucial element connecting mobile devices to a core network. The base stations can act as an access point, transmitting and receiving wireless signals to and from user devices, such as smartphones and tablets. The core network can manage and control various functions to enable seamless communication and data transfer between user devices and services.

The vendor ecosystem 120 can include a network of companies and vendors that provide products, services, and solutions across different segments or components of the network infrastructure. The vendor ecosystem can include a plurality of systems specializing in areas such as like a transport 121, a core 122, a RAN 123, and a PaaS 124.

The transport 121 can refer to systems providing transport solutions for various networking equipment and technologies to facilitate data transmission and communication over long distances. For example, these solutions include fiber optic cables, microwave links, optical networking equipment, routers, switches, and multiplexers. The transport 121 can provide high-speed, reliable, and scalable connectivity solutions to support the data transmission needs of the network.

The core 122 can refer to systems providing equipment and technologies to form the central part of a telecommunications network. They offer core routers, switches, gateways, and other hardware and software solutions that handle high-volume traffic, routing, and switching between different parts of the network. The core 122 can help ensure efficient data flow and connectivity within the entire network infrastructure.

The RAN 123 can refer to systems providing equipment and technologies for the Radio Access Network, which is the part of a mobile telecommunications system that connects mobile devices (e.g., smartphones, tablets) to the core network through wireless connections. The RAN 123 can include base stations, antennas, radio equipment, and other solutions that enable wireless communication and data transmission for mobile devices.

The PaaS 124 can refer to systems offering platform-as-a-service solutions. The PaaS platforms can provide developers with tools, runtime environments, databases, and other resources to build, deploy, and manage applications without the complexity of infrastructure management. In some implementations, while PaaS is not directly related to the physical network infrastructure, the PaaS 124 can be an essential component for modern network applications and services that rely on cloud-based technologies.

The data storage 125 can store raw data, including unstructured, semi-structured, and structured data, in native formats. For example, unlike traditional data storage systems, the data storage 125 can accommodate vast amounts of data from various sources, such as transactional systems, social media, IoT devices, log files, and more. By way of further example, the data storage 125 can store data from the transport 121, the core 122, the RAN 123, and the PaaS 124.

The data storage 125 can support big data processing and analytics. For example, by storing data in its raw form, data engineers and data scientists can access and process the data according to specific use cases without worrying about data transformation or schema changes.

The observability framework 130 can include a comprehensive set of tools, techniques, and practices that provide deep insights into the network's behavior, performance, and health. The observability framework 130 can provide real-time visibility, monitoring, and analysis of various components, including the transport 131, the core 132, the RAN 133, and the PaaS 134. The observability framework 130 can help manage the 5G network by identifying and resolving issues, and optimizing performance.

In some implementations, in the transport domain 131 of a 5G network, the observability framework 130 can include tools to monitor the network's physical infrastructure, such as fiber optic cables, microwave links, and transmission systems. These tools can track key performance indicators (KPIs) like bandwidth utilization, latency, packet loss, and link stability. This data can be used to identify bottlenecks, optimize network routes, and ensure seamless data transmission between different network segments.

In some implementations, for the core network 132, the observability framework 130 can provide real-time visibility into the network elements, core routers, switches, and gateways. The observability framework 130 can monitor the network's signaling and control plane activities, tracking signaling messages, session states, and service interactions. This information can be used to ensure smooth traffic flow, identify potential congestion points, and detect any anomalies or security threats in the core network.

In some implementations, in the RAN domain 133, the observability framework 130 can monitor the base stations, radio equipment, and air interface interactions. The observability framework 130 can track parameters like signal strength, handovers, coverage areas, and device-specific metrics. By observing RAN performance, the network system 100 can optimize coverage, ensure efficient spectrum utilization, and deliver a seamless user experience with minimal signal interference.

In some implementations, in the PaaS domain 134, the observability framework 130 can monitor the cloud-native infrastructure and services used in the 5G network. The observability framework 130 can observe virtual machines, containers, cloud resources, and platform components like databases and middleware. By monitoring PaaS resources, the network system 100 can ensure resource availability, scalability, and performance for the applications and services hosted on the cloud platform.

Thus, the observability framework 130 in a 5G network can collect data from different layers of the network, consolidate it into meaningful insights, and provide the network system 100 with the information to make informed decisions, troubleshoot issues, and ensure the network operates at its highest potential. The observability framework 130 can maximize the benefits of 5G technology, deliver high-quality services, and maintain a reliable and efficient 5G network.

Each of the domains (the transport 131, the core 132, the RAN 133, and the PaaS 134) can implement an individual observability framework, which can identify events and anomalies in the network. In some implementations, the identified events and anomalies can be stored in the data storage 125.

In some implementations, the observability framework 130 can provide a unified and centralized view or interface that provides the network system 100 with a comprehensive and real-time overview of the entire network's performance, health, and status. For example, the observability framework 130 can collect all relevant information and data available from the transport 131, the core 132, the RAN 133, and the PaaS 134 in one place, making it easier for the network system 100 to monitor and manage the network efficiently.

The unified and centralized view or interface provided by the observability framework 130 can provide the following features.

The observability framework 130 can provide a unified view of the entire network infrastructure, including various components like transport, core, RAN, and PaaS. Instead of having to access multiple individual monitoring tools or interfaces for each network segment, the observability framework 130 can combine and display all relevant data in a single, integrated dashboard.

The interface can provide real-time insights into the network's performance, health, and key performance indicators (KPIs). This real-time data can help the network system 100 to identify issues, anomalies, and potential bottlenecks as they occur, allowing for immediate action and timely troubleshooting.

The observability framework 130 can aggregate data from different sources and monitoring tools within the observability framework 130. It can collect data from network devices, servers, virtual machines, cloud services, and other relevant sources, providing a holistic view of the entire network ecosystem.

The interface can allow the network system 100 to customize the information displayed based on specific needs and priorities. In some implementations, the interface can offer drill-down capabilities that enable the network system 100 to dive deeper into specific network segments or components for more detailed analysis when necessary.

Having all critical network information in one place can simplify network management and reduce the need to switch between multiple tools and interfaces. This enhanced visibility and ease of access allow the network system 100 to respond quickly to issues, make informed decisions, and ensure optimal network performance.

The interface can encompass a cross-domain view, providing observability across various layers and technologies in the network. This cross-domain observability is particularly beneficial in complex network environments, such as those involving both physical and virtual infrastructure, or on-premises and cloud-based components.

The network platform 150 can streamline and optimize network resource management and service provisioning in complex and dynamic 5G networks. For example, the network platform 150 can provide a centralized and comprehensive view of all network resources, including physical and virtual assets.

The network platform 150 can provide visual representations of the 5G network topology, showing the relationships between different network elements and their connectivity. This visual representation can provide insights into the network's structure and dependencies.

The network platform 150 can also provide real-time data about the status and availability of network resources. The network platform 150 continuously updates the inventory database to reflect changes in the network, ensuring accurate and up-to-date information for network operations and service provisioning.

The external systems 160 can provide observation information regarding the network. For example, the observation information can include information regarding customer experience with the network.

The machine learning model 140 can be configured to perform operations to identify and predict fault conditions in the network.

For example, the machine learning model 140 can perform operations to identify a fault condition in the network, the operations including receiving, from multiple subsystems including the transport 131, the core 132, the RAN 133, and the PaaS 134, information associated with multiple alerts triggered across the multiple subsystems, where each of the multiple alerts indicates a corresponding potential fault condition in one of the multiple subsystems, identifying, a subset of alerts of the multiple alerts, where the subset of alerts represents a set of one or more root fault conditions associated with the multiple alerts triggered across the multiple subsystems, where a number of alerts in the subset of alerts is less than the number of the multiple alerts, and identifying one or more remediating actions configured to address the one or more root fault conditions in at least one corresponding subsystem of the multiple subsystems.

As described above with respect to the observability framework 130, the multiple subsystems including the transport 131, the core 132, the RAN 133, and the PaaS 134 can provide a range of network testing, monitoring, and analytics solutions, a central component configured to perform collecting, storing, analyzing, and visualizing telemetry data, a radio access network (RAN) configured to provide wireless connectivity between user devices and the wireless network, and a cloud computing model configured to provide a platform for developing, deploying, and managing applications.

In some implementations, identifying the subset of alerts can include identifying a timeline of events associated with the subset of alerts. In some implementations, identifying the subset of alerts of the multiple alerts can include identifying unusual patterns of behavior in the multiple alerts to correlate the subset of alerts associated with the identified unusual patterns of behavior.

In some implementations, identifying the subset of alerts of the multiple alerts can include combining the multiple alerts into the subset of alerts. In some implementations, identifying the subset of alerts of the multiple alerts can include setting a threshold value that changes over time and identifying the subset of alerts of the multiple alerts, among the multiple alerts, associated with a value greater than the threshold value.

The operations can further include receiving, from the network platform 150, information regarding resources of the wireless network. In some implementations, identifying the subset of alerts can include identifying the subset of alerts based on the information regarding resources, where the information regarding the resources includes a topology of the wireless network.

In some implementations, the machine learning model 140 can perform operations to predict a fault condition in the network. For example, the operations for predicting a fault condition in the network include receiving, from multiple subsystems (e.g., the transport 131, the core 132, the RAN 133, and the PaaS 134), information associated with multiple alerts triggered across the multiple subsystems, each of the multiple alerts being indicative of a corresponding potential fault condition in one of the multiple subsystems, receiving, from a plurality of external systems 160, observation information regarding the network, receiving, from the network platform 150, information regarding resources of the network, training the machine learning model using the multiple alerts, the observation information, and the information regarding the resources, identifying a subset of alerts of the multiple alerts, where the subset of alerts represents a set of one or more predicted fault conditions associated with the multiple alerts triggered across the multiple subsystems, a number of alerts in the subset of alerts being less than the number of the multiple alerts, and training the machine learning model using the subset of alerts.

In some implementations, the operations can further include identifying, by the machine learning model, one or more remediating actions configured to address the one or more predicted fault conditions in at least one corresponding subsystem of the multiple subsystems.

As described above with respect to the observability framework 130, the multiple alerts can be provided in different formats from the multiple subsystems.

In some implementations, the information regarding the resources can include physical attributes, logical attributes, locations, statuses, information identifying new resources added to the wireless network, and a network topology.

Figure 2:
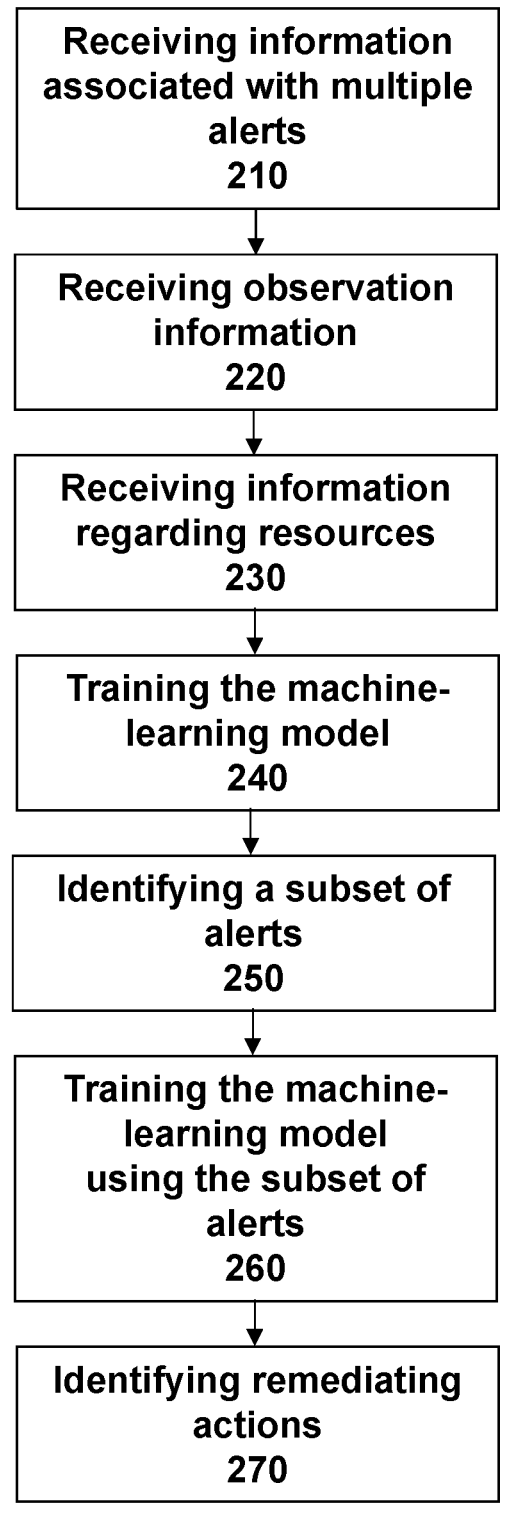
FIG. 2 is a flowchart showing an exemplary network fault prediction process.

In some implementations, training the machine learning model 140 includes identifying and selecting features from the multiple alerts, the observation information, and the information regarding the resources to be used in the machine learning model. In some implementations, training the machine learning model 140 using the subset of alerts includes comparing the subset of alerts to expected alerts, and updating the machine learning model based on a discrepancy between the subset of alerts and the expected alerts. In some implementations, the machine learning model 140 can be trained using supervised learning, unsupervised learning, or reinforcement learning FIG. 2 is a flowchart showing an example of network faults prediction process 200.

In step 210, the machine learning model 140 can receive, from multiple subsystems (the transport 131, the core 132, the RAN 133, and the PaaS 134) of the network, information associated with multiple alerts triggered across the multiple subsystems, where each of the multiple alerts indicates a corresponding potential fault condition in one of the multiple subsystems. For example, the machine learning model 140 can receive the information from the multiple subsystems. In some implementations, the machine learning model 140 can receive the information from the data storage 125 in which the information associated with the multiple alerts is stored.

In step 220, the machine learning model 140 can receive, from a plurality of external systems 160, observation information regarding the network. For example, the observation information can include information regarding customer experience with the network.

In step 230, the machine learning model 140 can receive, from a network platform 150, information regarding resources of the wireless network. For example, the information regarding the resources can include physical attributes, logical attributes, locations, statuses, information identifying new resources added to the network, and a network topology.

In step 240, the machine learning model 140 can be trained using the multiple alerts, the observation information, and the information regarding the resources. For example, training the machine learning model includes identifying and selecting features from the multiple alerts, the observation information, and the information regarding the resources to be used in the machine learning model. The machine learning model can be trained using supervised learning, unsupervised learning, or reinforcement learning.

In some implementations, the machine learning model 140 can be trained by identifying the most relevant features or attributes from the dataset that contribute significantly to the model's predictive power. This can reduce dimensionality and eliminate irrelevant or redundant features, which can help prevent overfitting and improve model efficiency.

In step 250, the machine learning model 140 can identify a subset of alerts of the multiple alerts, where the subset of alerts represents a set of one or more predicted fault conditions associated with the multiple alerts triggered across the multiple subsystems. In some implementations, a number of alerts in the subset of alerts is less than the number of the multiple alerts.

In step 260, the machine learning model 140 can be trained using the subset of alerts identified in step 250. For example, the machine learning model 140 can be trained by comparing the subset of alerts to expected alerts, and updating the machine learning model based on a discrepancy between the subset of alerts and the expected alerts.

In some implementations, the machine learning model 140 learns from historical data in which alerts are correctly classified (expected alerts) and applies this knowledge to predict future alerts based on new input data. The machine learning model 140 can extract, from the subset of alerts, relevant features (characteristics) that can help the machine learning model 140 understand the patterns and relationships between alerts and their expected outcomes. These features can include various attributes, metadata, or statistics associated with each alert. The expected alerts can be labeled with corresponding class labels, indicating their correct classification. For example, alerts might be labeled as "normal" or "anomalous" based on whether they represent regular or unexpected behavior in the system.

Using the labeled data, the machine learning model 140 can be trained to learn the relationship between the extracted features and the corresponding class labels. The model can use various algorithms and optimization techniques to iteratively adjust its parameters and improve its ability to predict the correct labels for new alerts.

In step 270, the machine learning model 140 can identify one or more remediating actions configured to address the one or more predicted fault conditions in at least one corresponding subsystem of the multiple subsystems. For example, the one or more remediating actions can include microservice restart, an Elastic Kubernetes Service (EKS) pod restart, an application restart, a routing unit (RU) restart, traffic redirection, cell lock/unlock after call draining, and graceful shutdown of a container network function/virtual network function (CNF/VNF).

A microservice can be restarted when a specific microservice within an application is experiencing issues, as a quick way to recover. A microservice restart can clear any internal state problems or resource leaks and can be used when a single microservice is misbehaving or unresponsive.

The EKS may refer to a container orchestration service. Restarting a pod in EKS may refer to terminating and recreating the container instance and can be used to address issues at the container level, such as resource exhaustion or unexpected behavior.

An application restart can restart the entire application or one or more of its components that are necessary to clear memory leaks or other issues at the application level. An application restart can be applied when the entire application is unstable or specific components are causing problems.

An RU restart can refer to rebooting routing components such as routers or switches in the network. RU restart can resolve routing-related issues such as routing problems, security concerns, or performance issues.

Traffic redirection can be performed to divert network traffic from one path to another, often as part of a failover or load-balancing strategy. In some implementations, traffic redirection can be implemented during disaster recovery or when a specific network path needs to be temporarily avoided.

Cell locking can refer to blocking new connections in a specific cell, and cell draining can refer to a process of allowing existing calls to complete before taking action. Cell lock/unlock after call draining can be applied when maintenance or configuration changes are required in a specific cell to minimize service disruption.

A graceful shutdown of CNF/VNF can include terminating virtualized network functions while ensuring that ongoing network traffic is rerouted without service interrupt and can be used when scaling down network resources, performing maintenance on virtualized network functions, or reallocating resources.

Figure 3:
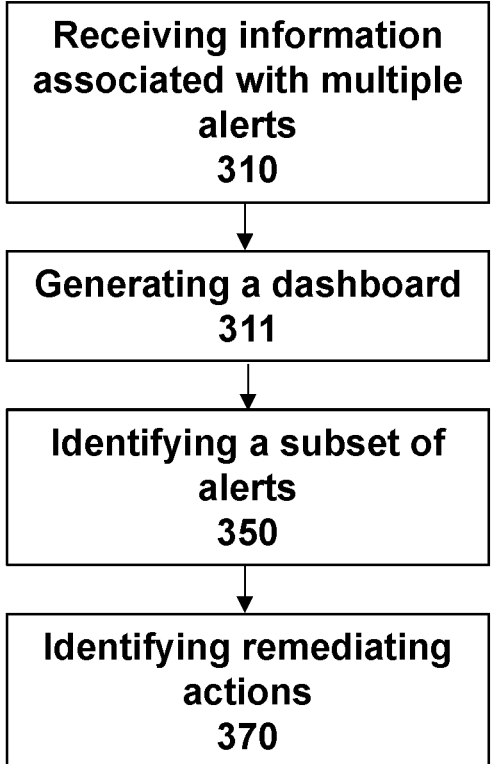
FIG. 3 is a flowchart showing an exemplary network fault identification process.

FIG. 3 is a flowchart showing an exemplary network faults identification process 300.

In step 310, the machine learning model 140 can receive, from multiple subsystems (the transport 131, the core 132, the RAN 133, and the PaaS 134) of the network, information associated with multiple alerts triggered across the multiple subsystems, where each of the multiple alerts indicates a corresponding potential fault condition in one of the multiple subsystems. For example, the machine learning model 140 can receive the information from the multiple subsystems. In some implementations, the machine learning model 140 can receive the information from the data storage 125 in which the information associated with the multiple alerts is stored.

As described above with respect to the observability framework 130, the multiple subsystems (the transport 131, the core 132, the RAN 133, and the PaaS 134) can include an external provider configured to provide a range of network testing, monitoring, and analytics solutions, a central component configured to perform collecting, storing, analyzing, and visualizing telemetry data, a radio access network (RAN) configured to provide wireless connectivity between user devices and the wireless network, and a cloud computing model configured to provide a platform for developing, deploying, and managing applications. Each of the multiple subsystems can be configured to monitor, measure, and analyze a performance of the network.

In step 311, as described above with respect to the observability framework 130, the observability framework 130 can generate a dashboard configured to provide real-time visibility and management of network operations of the wireless network in a single interface, where the dashboard is configured to display the subset of alerts.

In step 350, the machine learning model 140 can identify a subset of alerts of the multiple alerts, where the subset of alerts represents a set of one or more root fault conditions associated with the multiple alerts triggered across the multiple subsystems. In some implementations, a number of alerts in the subset of alerts is less than the number of the multiple alerts.

In some implementations, identifying the subset of alerts includes identifying a timeline of events associated with the subset of alerts. In some implementations, identifying the subset of alerts of the multiple alerts includes identifying unusual patterns of behavior in the multiple alerts to correlate the subset of alerts associated with the identified unusual patterns of behavior.

In some implementations, identifying the subset of alerts of the multiple alerts includes combining the multiple alerts into the subset of alerts. In some implementations, identifying the subset of alerts of the multiple alerts includes setting a threshold value that changes over time and identifying the subset of alerts of the multiple alerts, among the multiple alerts, associated with a value greater than the threshold value.

In step 360, the machine learning model 140 can identify one or more remediating actions configured to address the one or more root fault conditions in at least one corresponding subsystem of the multiple subsystems.

In some implementations, the machine learning model 140 can be trained using training data that identifies correlations between alerts generated in the multiple subsystems.

In some implementations, the machine learning model can receive, from a network platform 150, information regarding resources of the wireless network. In some implementations, the machine learning model 140 can identify the subset of alerts based on the information regarding resources, where the information regarding the resources includes a topology of the wireless network.

Figure 4:
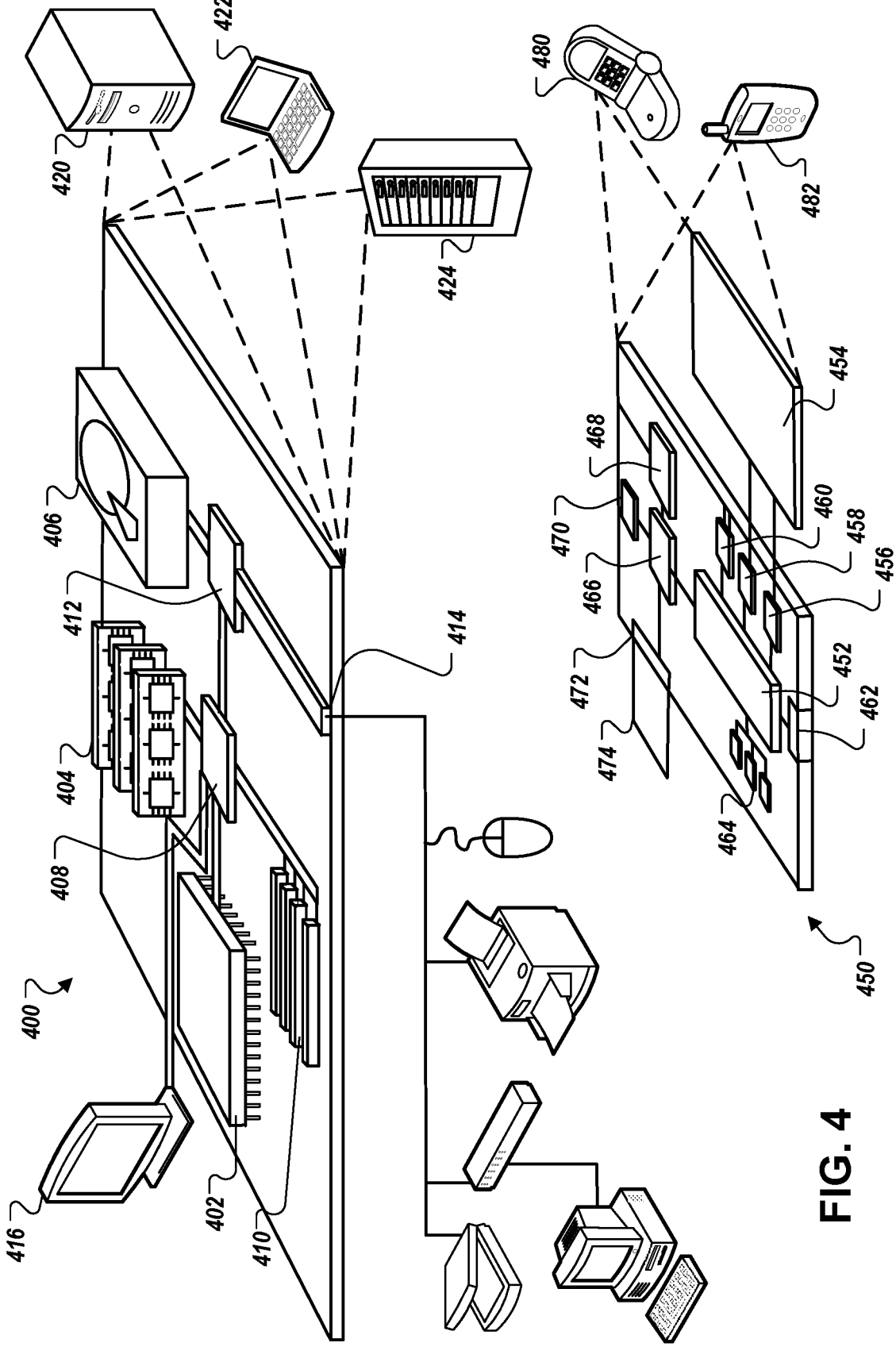
FIG. 4 is a diagram illustrating a computing system that can be used in connection with computer-implemented methods described in this specification.

FIG. 4 shows an example of a computing device 400 and a mobile computing device 450 (also referred to herein as a wireless device) that are employed to execute implementations of the present disclosure. The computing device 400 is intended to represent various forms of digital computers, such as laptops, desktops, workstations, personal digital assistants, servers, blade servers, mainframes, and other appropriate computers. The mobile computing device 450 is intended to represent various forms of mobile devices, such as personal digital assistants, cellular telephones, smartphones, AR devices, and other similar computing devices. The components shown here, their connections and relationships, and their functions are meant to be examples only and are not meant to be limiting. The computing device 400 and/or the mobile computing device 450 can form at least a portion of the application installation environment described above.

The computing device 400 includes a processor 402, a memory 404, a storage device 406, a high-speed interface 408, and a low-speed interface 412. In some implementations, the high-speed interface 408 connects to the memory 404 and multiple high-speed expansion ports 410. In some implementations, the low-speed interface 412 connects to a low-speed expansion port 414 and the storage device 406. Each of the processor 402, the memory 404, the storage device 406, the high-speed interface 408, the high-speed expansion ports 410, and the low-speed interface 412 is interconnected using various buses, and may be mounted on a common motherboard or in other manners as appropriate. The processor 402 can process instructions for execution within the computing device 400, including instructions stored in the memory 404 and/or on the storage device 406 to display graphical information for a graphical user interface (GUI) on an external input/output device, such as a display 416 coupled to the high-speed interface 408. In other implementations, multiple processors and/or multiple buses may be used, as appropriate, along with multiple memories and types of memory. In addition, multiple computing devices may be connected, with each device providing portions of the necessary operations (e.g., as a server bank, a group of blade servers, or a multi-processor system).

The memory 404 stores information within the computing device 400. In some implementations, the memory 404 is a volatile memory unit or units. In some implementations, the memory 404 is a non-volatile memory unit or units. The memory 404 may also be another form of a computer-readable medium, such as a magnetic or optical disk.

The storage device 406 is capable of providing mass storage for the computing device 400. In some implementations, the storage device 406 may be or include a computer-readable medium, such as a floppy disk device, a hard disk device, an optical disk device, a tape device, flash memory, or another similar solid-state memory device, or an array of devices, including devices in a storage area network or other configurations. Instructions can be stored in an information carrier. The instructions, when executed by one or more processing devices, such as the processor 402, perform one or more methods, such as those described above. The instructions can also be stored by one or more storage devices, such as computer-readable or machine-readable media, such as the memory 404, the storage device 406, or memory on the processor 402.

The high-speed interface 408 manages bandwidth-intensive operations for the computing device 400, while the low-speed interface 412 manages less bandwidth-intensive operations. Such allocation of functions is an example only. In some implementations, the high-speed interface 408 is coupled to the memory 404, the display 416 (e.g., through a graphics processor or accelerator), and to the high-speed expansion ports 410, which may accept various expansion cards. In some implementations, the low-speed interface 412 is coupled to the storage device 406 and the low-speed expansion port 414. The low-speed expansion port 414, which may include various communication ports (e.g., Universal Serial Bus (USB), Bluetooth, Ethernet, wireless Ethernet), may be coupled to one or more input/output devices. Such input/output devices may include a scanner, a printing device, or a keyboard or mouse. The input/output devices may also be coupled to the low-speed expansion port 414 through a network adapter. Such network input/output devices may include, for example, a switch or router.

The computing device 400 may be implemented in a number of different forms, as shown in FIG. 4. For example, it may be implemented as a standard server 420, or multiple times in a group of such servers. In addition, it may be implemented in a personal computer such as a laptop computer 422. It may also be implemented as part of a rack server system 424. Alternatively, components from the computing device 400 may be combined with other components in a mobile device, such as a mobile computing device 450. Each of such devices may contain one or more of the computing device 400 and the mobile computing device 450, and an entire system may be made up of multiple computing devices communicating with each other. The computing device 400 may be implemented in the observability framework 130 described with respect to FIGS. 1-3. In some implementations, the machine learning model 140 can be implemented in using the computing device 400.

The mobile computing device 450 includes a processor 452; a memory 464; an input/output device, such as a display 454; a communication interface 466; and a transceiver 468; among other components. The mobile computing device 450 may also be provided with a storage device, such as a micro-drive or other device, to provide additional storage. Each of the processor 452, the memory 464, the display 454, the communication interface 466, and the transceiver 468, are interconnected using various buses, and several of the components may be mounted on a common motherboard or in other manners as appropriate. In some implementations, the mobile computing device 450 may include a camera device(s) (not shown).

The processor 452 can execute instructions within the mobile computing device 450, including instructions stored in the memory 464. The processor 452 may be implemented as a chipset of chips that include separate and multiple analog and digital processors. For example, the processor 452 may be a Complex Instruction Set Computers (CISC) processor, a Reduced Instruction Set Computer (RISC) processor, or a Minimal Instruction Set Computer (MISC) processor. The processor 452 may provide, for example, for coordination of the other components of the mobile computing device 450, such as control of user interfaces (UIs), applications run by the mobile computing device 450, and/or wireless communication by the mobile computing device 450.

The processor 452 may communicate with a user through a control interface 458 and a display interface 456 coupled to the display 454. The display 454 may be, for example, a Thin-Film-Transistor Liquid Crystal Display (TFT) display, an Organic Light Emitting Diode (OLED) display, or other appropriate display technology. The display interface 456 may include appropriate circuitry for driving the display 454 to present graphical and other information to a user. The control interface 458 may receive commands from a user and convert them for submission to the processor 452. In addition, an external interface 462 may provide communication with the processor 452, so as to enable near-area communication of the mobile computing device 450 with other devices. The external interface 462 may provide, for example, for wired communication in some implementations, or for wireless communication in other implementations, and multiple interfaces may also be used.

The memory 464 stores information within the mobile computing device 450. The memory 464 can be implemented as one or more of a computer-readable medium or media, a volatile memory unit or units, or a non-volatile memory unit or units. An expansion memory 474 may also be provided and connected to the mobile computing device 450 through an expansion interface 472, which may include, for example, a Single In-line Memory Module (SIMM) card interface. The expansion memory 474 may provide extra storage space for the mobile computing device 450, or may also store applications or other information for the mobile computing device 450. Specifically, the expansion memory 474 may include instructions to carry out or supplement the processes described above, and may also include secure information. Thus, for example, the expansion memory 474 may be provided as a security module for the mobile computing device 450, and may be programmed with instructions that permit secure use of the mobile computing device 450. In addition, secure applications may be provided via the SIMM cards, along with additional information, such as placing identifying information on the SIMM card in a non-hackable manner.

The memory may include, for example, flash memory and/or non-volatile random access memory (NVRAM), as discussed below. In some implementations, instructions are stored in an information carrier. The instructions, when executed by one or more processing devices, such as the processor 452, perform one or more methods, such as those described above. The instructions can also be stored by one or more storage devices, such as one or more computer-readable or machine-readable media, such as the memory 464, the expansion memory 474, or memory on the processor 452. In some implementations, the instructions can be received in a propagated signal, such as, over the transceiver 468 or the external interface 462.

The mobile computing device 450 may communicate wirelessly through the communication interface 466, which may include digital signal processing circuitry where necessary. The communication interface 466 may provide for communications under various modes or protocols, such as Global System for Mobile communications (GSM) voice calls, Short Message Service (SMS), Enhanced Messaging Service (EMS), Multimedia Messaging Service (MMS) messaging, code division multiple access (CDMA), time division multiple access (TDMA), Personal Digital Cellular (PDC), Wideband Code Division Multiple Access (WCDMA), CDMA2000, General Packet Radio Service (GPRS). Such communication may occur, for example, through the transceiver 468 using a radio frequency. In addition, short-range communication, such as using Bluetooth or Wi-Fi, may occur. In addition, a Global Positioning System (GPS) receiver module 470 may provide additional navigation- and location-related wireless data to the mobile computing device 450, which may be used as appropriate by applications running on the mobile computing device 450.

The mobile computing device 450 may also communicate audibly using an audio codec 460, which may receive spoken information from a user and convert it to usable digital information. The audio codec 460 may likewise generate audible sound for a user, such as through a speaker, e.g., in a handset of the mobile computing device 450. Such sound may include sound from voice telephone calls, may include recorded sound (e.g., voice messages, music files, etc.) and may also include sound generated by applications operating on the mobile computing device 450.

The mobile computing device 450 may be implemented in a number of different forms, as shown in FIG. 4. For example, it may be implemented in the mobile device described with respect to FIGS. 1-3. Other implementations may include a phone device 482 and a tablet device 484. The mobile computing device 450 may also be implemented as a component of a smartphone, personal digital assistant, AR device, or other similar mobile device.

The computing device 400 and/or the mobile computing device 450 can also include USB flash drives. The USB flash drives may store operating systems and other applications. The USB flash drives can include input/output components, such as a wireless transmitter or USB connector that may be inserted into a USB port of another computing device.

Although a few implementations have been described in detail above, other modifications may be made without departing from the scope of the inventive concepts described herein, and, accordingly, other implementations are within the scope of the following claims.

What is claimed is:

1. A method for automatically identifying a fault condition in a wireless network, the method comprising:

receiving, at a trained machine learning model from multiple subsystems of the wireless network, information associated with multiple alerts triggered across the multiple subsystems, each of the multiple alerts being indicative of a corresponding potential fault condition in one of the multiple subsystems;

receiving, from a network platform, information regarding resources of the wireless network, including a topology defining relationships, connectivity, and dependencies among network elements of the multiple subsystems;

identifying, by the machine learning model, a subset of alerts of the multiple alerts by correlating the multiple alerts with the topology to identify a root cause of a cascade of alerts across the multiple subsystems based on the information regarding resources, wherein the subset of alerts represents a set of one or more root fault conditions associated with the multiple alerts triggered across the multiple subsystems and includes fewer alerts than are included in the multiple alerts; and identifying, by the machine learning model, one or more remediating actions configured to address the one or more root fault conditions in at least one corresponding subsystem of the multiple subsystems, wherein the machine learning model is trained using the information regarding the resources, including the topology and physical and virtual assets of the wireless network, and training data that identifies correlations between alerts generated in the multiple subsystems according to the dependencies defined by the topology.

2. The method of claim 1, wherein the wireless network is configured to perform fifth-generation (5G) cloud-native network operations.

3. The method of claim 1, wherein the multiple subsystems include an external provider configured to provide a range of network testing, monitoring, and analytics solutions, a central component configured to perform collecting, storing, analyzing, and visualizing telemetry data, a radio access network (RAN) configured to provide wireless connectivity between user devices and the wireless network, and a cloud computing model configured to provide a platform for developing, deploying, and managing applications.

4. The method of claim 3, wherein each of the multiple subsystems is configured to monitor, measure, and analyze a performance of the wireless network.

5. The method of claim 1, further comprising generating a dashboard configured to provide real-time visibility and management of network operations of the wireless network in a single interface, wherein the dashboard is configured to display the subset of alerts.

6. The method of claim 1, wherein identifying the subset of alerts comprises identifying a timeline of events associated with the subset of alerts.

7. The method of claim 1, wherein identifying the subset of alerts of the multiple alerts includes identifying unusual patterns of behavior in the multiple alerts to correlate the subset of alerts associated with the identified unusual patterns of behavior.

8. The method of claim 1, wherein identifying the subset of alerts of the multiple alerts includes combining the multiple alerts into the subset of alerts.

9. The method of claim 1, wherein identifying the subset of alerts of the multiple alerts includes setting a threshold value that changes over time and identifying the subset of alerts of the multiple alerts, among the multiple alerts, associated with a value greater than the threshold value.

10. A system for automatically identifying a fault condition in a wireless network, the system comprising:

multiple subsystems configured to monitor, measure, and analyze a performance of the wireless network;

memory; and at least one processor, coupled to the memory and using a trained machine learning model, the at least one processor configured to:

receive, at the machine learning model from the multiple subsystems of the wireless network, information associated with multiple alerts triggered across the multiple subsystems, each of the multiple alerts being indicative of a corresponding potential fault condition in one of the multiple subsystems;

receive, from a network platform, information regarding resources of the wireless network, including a topology defining relationships, connectivity, and dependencies among network elements of the multiple subsystems;

identify, by the machine learning model, a subset of alerts of the multiple alerts by correlating the multiple alerts with the topology to identify a root cause of a cascade of alerts across the multiple subsystems based on the information regarding resources, wherein the subset of alerts represents a set of one or more root fault conditions associated with the multiple alerts triggered across the multiple subsystems and includes fewer alerts than are included in the multiple alerts; and identify, by the machine learning model, one or more remediating actions configured to address the one or more root fault conditions in at least one corresponding subsystem of the multiple subsystems, wherein the machine learning model is trained using the information regarding the resources including the topology and physical and virtual assets of the wireless network, and training data that identifies correlations between alerts generated in the multiple subsystems according to the dependencies defined by the topology.

11. The system of claim 10, wherein the wireless network is configured to perform fifth-generation (5G) cloud-native network operations.

12. The system of claim 10, wherein the multiple subsystems include an external provider configured to provide a range of network testing, monitoring, and analytics solutions, a central component configured to perform collecting, storing, analyzing, and visualizing telemetry data, a radio access network (RAN) configured to provide wireless connectivity between user devices and the wireless network, and a cloud computing model configured to provide a platform for developing, deploying, and managing applications.

13. The system of claim 10, wherein the at least one processor is further configured to generate a dashboard configured to provide real-time visibility and management of network operations of the wireless network in a single interface, wherein the dashboard is configured to display the subset of alerts.

14. The system of claim 10, wherein identifying the subset of alerts comprises identifying a timeline of events associated with the subset of alerts.

15. The system of claim 10, wherein identifying the subset of alerts of the multiple alerts includes identifying unusual patterns of behavior in the multiple alerts to correlate the subset of alerts associated with the identified unusual patterns of behavior.

16. The system of claim 10, wherein identifying the subset of alerts of the multiple alerts includes combining the multiple alerts into the subset of alerts.

17. The system of claim 10, wherein identifying the subset of alerts of the multiple alerts includes setting a threshold value that changes over time and identifying the subset of alerts of the multiple alerts, among the multiple alerts, associated with a value greater than the threshold value.

18. A non-transitory computer-readable medium encoded with instructions that, when executed by one or more computers, cause the one or more computers to perform operations comprising:

receiving, at a trained machine learning model from multiple subsystems of a wireless network, information associated with multiple alerts triggered across the multiple subsystems, each of the multiple alerts being indicative of a corresponding potential fault condition in one of the multiple subsystems;

receiving, from a network platform, information regarding resources of the wireless network, including a topology defining relationship, connectivity, and dependencies among network elements of the multiple subsystems;

identifying, by the machine learning model, a subset of alerts of the multiple alerts by correlating the multiple alerts with the topology to identify a root cause of a cascade of alerts across the multiple subsystems based on the information regarding resources, wherein the subset of alerts represents a set of one or more root fault conditions associated with the multiple alerts triggered across the multiple subsystems and include fewer alerts than are included in the multiple alerts; and identifying, by the machine learning model, one or more remediating actions configured to address the one or more root fault conditions in at least one corresponding subsystem of the multiple subsystems, wherein the machine learning model is trained using the information regarding the resources including the topology and physical and virtual assets of the wireless network, and training data that identifies correlations between alerts generated in the multiple subsystems according to the dependencies defined by the topology.

19. The non-transitory computer-readable medium of claim 18, wherein the multiple subsystems include an external provider configured to provide a range of network testing, monitoring, and analytics solutions, a central component configured to perform collecting, storing, analyzing, and visualizing telemetry data, a radio access network (RAN) configured to provide wireless connectivity between user devices and the wireless network, and a cloud computing model configured to provide a platform for developing, deploying, and managing applications.

20. The non-transitory computer-readable medium of claim 19, wherein each of the multiple subsystems is configured to monitor, measure, and analyze a performance of the wireless network.

* * * * *